L. B. JONES.
VOLTAGE REGULATION.
APPLICATION FILED NOV. 4, 1913.
1,171,208.
Patented Feb. 8, 1916.
2 SHEETS—SHEET 1.
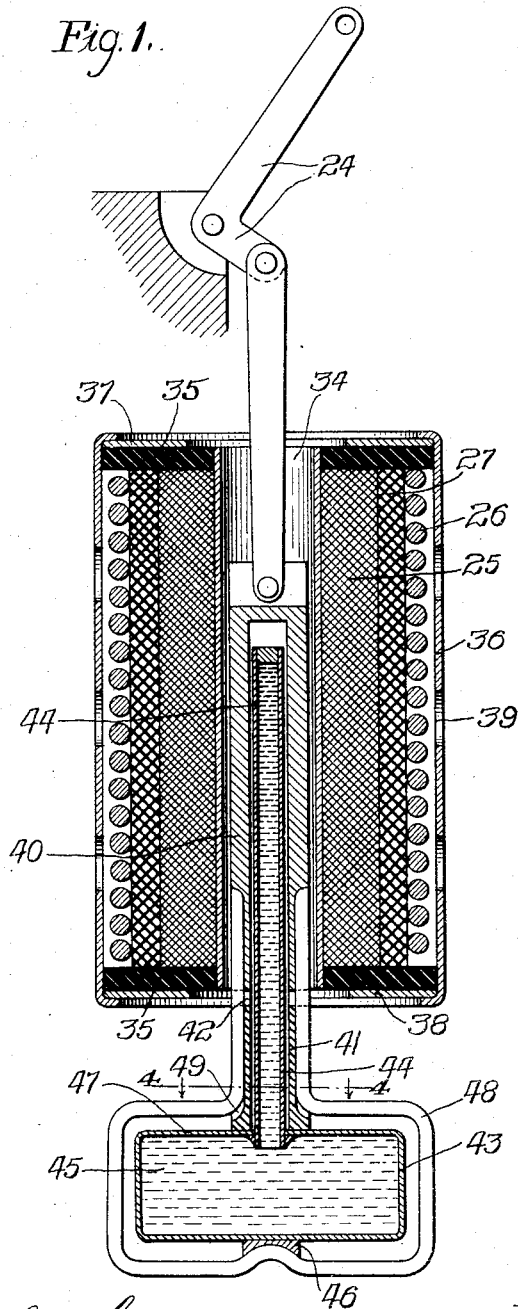
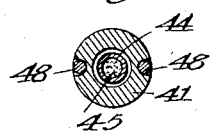
Witnesses
Harry S. Gaither
Ephraim Banning
Inventor
Lee B. Jones
by Banning & Banning
Attys.
THE COLUMBIA PLANOGRAPH CO., WASHINGTON, D. C.

L. B. JONES.
VOLTAGE REGULATION.
APPLICATION FILED NOV. 4, 1913.
1,171,208.
Patented Feb. 8, 1916.
2 SHEETS—SHEET 2.
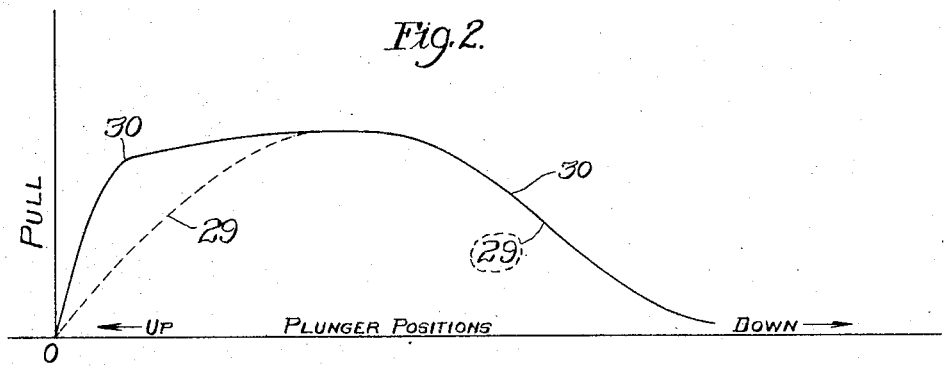
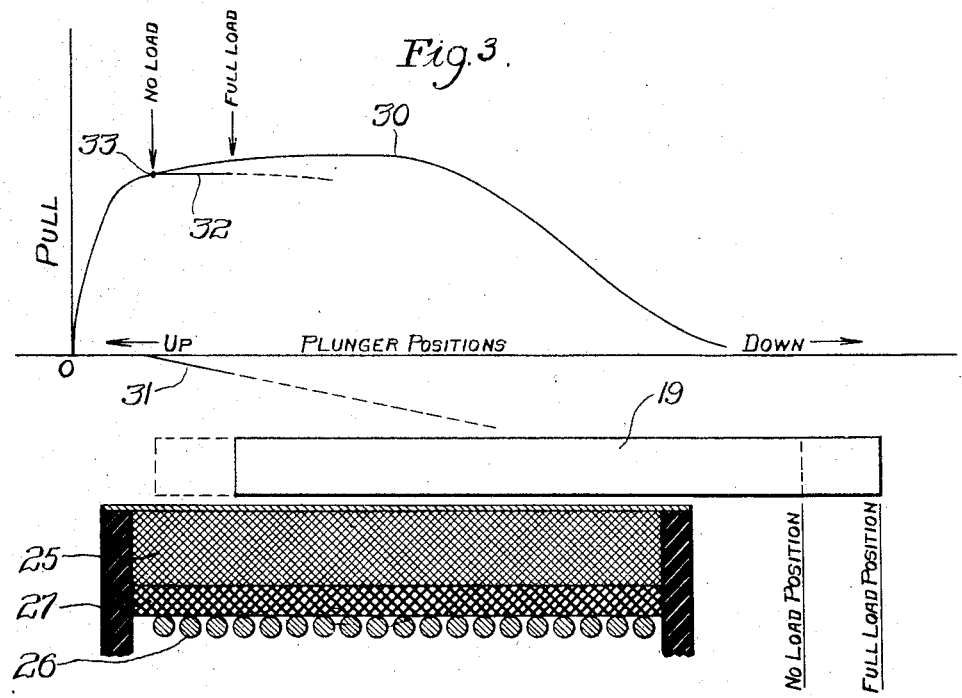
Witnesses:
Harry S. Gaither
Ephraim Banning
Inventor
Lee B. Jones
by Banning & Banning
Attys.

UNITED STATES PATENT OFFICE.

LEE B. JONES, OF KANSAS CITY, MISSOURI.

VOLTAGE REGULATION.

1,171,208.  Specification of Letters Patent.  Patented Feb. 8, 1916.

Application filed November 4, 1913. Serial No. 799,095.

*To all whom it may concern:*

Be it known that I, LEE B. JONES, a citizen of the United States, residing at Kansas City, in the county of Jackson and State of Missouri, have invented certain new and useful Improvements in Voltage Regulation, of which the following is a specification.

The present invention relates to certain improvements in means for the regulation of voltage on electric distribution systems and has reference to the mechanism whereby the regulation may be secured.

It may be stated that the features of invention herein disclosed are intended particularly for use in connection with that class of electric distribution systems in which a generating unit of suitable form, such as an internal-combustion-engine-driven-dynamo, serves to supply current to the distribution mains. It will presently appear, however, that the features of the invention are in no wise limited to use in connection with such a system as the above but may be used with equal advantage and facility in connection with other systems.

A feature of the present invention has to do with compensation for temperature changes in the regulator or governor itself. It will be understood that practically all commercial materials for electrical conductors change their resistance with change of temperature. For example, the resistance of copper wire increases as its temperature rises. It therefore follows that unless means are provided for compensating for this change of temperature the amount of current flowing in a solenoid of copper wire will not depend simply on voltage, but will also vary with the temperature change. Therefore, unless compensation is made for changes of temperature it will be found that the governor will regulate for one voltage when cold, and for another voltage when its temperature has risen after a period of continuous service. In the governor herein disclosed, compensation is made for such change of temperature, so that within wide limits the governor will maintain constant voltage, regardless of changes in its own temperature.

Another feature of the invention has reference to the manner of effecting the regulation in the governor, so that a very delicate and accurate regulation may be obtained within wide limits. In this connection it is desired in one form of the invention to provide a governor of such construction that its operation may depend upon changes in the volume of power current, as distinguished from changes in voltage, thus making it possible to secure the desired regulation without change of voltage, or even to secure an increasing or decreasing voltage with an increasing load.

Other features of the invention will appear from a detailed description of the same, wihich consists in the features of construction and combinations of parts hereinafter described and claimed.

In the drawings: Figure 1 shows in cross-section one form of governor embodying the features of the present invention; Fig. 2 shows by means of a curve diagram the characteristics of a simple plunger solenoid; Fig. 3 shows by means of a curve diagram the characteristics of a governor including solenoids operating on a common plunger in accordance with one embodiment of the features of my invention; and Fig. 4 is a section taken on line 4—4 of Fig. 1, looking in the direction of the arrows.

The particular governor illustrated is so constructed that one of its solenoids serves to "float" the plunger 19, while the desired movements of such plunger for regulation purposes may be secured by influence exerted by another solenoid, the current in which may be proportional to the volume of current on the load. It will presently appear, however, that one of these coils may be omitted. In the particular arrangement illustrated the full volume of the load current may be passed through this other solenoid, but it is manifest that smaller proportional amounts of current might be used, such as would be secured for example by means of a "shunt," or by means of a series transformer. In addition to these two main coils the governor herein disclosed is provided with another coil which may be used for any purpose desired.

The floating coil is designated 25, the operating coil 26, and the third coil is designated 27. The coil 26 is shown as being of heavy wire and few turns as the volume of current handled by it is comparatively large. The "floating" coil 25 may have its terminals connected across between those portions of the circuit or system whose difference of potential it is desired to regulate. When thus connected the regulator will maintain the potential between these points of attachment constant, or will cause said potential to rise as the load comes on, or will allow it to fall a predetermined amount as the load comes on, depending upon the characteristics and adjustment of the governor.

Referring now to Figs. 2 and 3 the curve 29 shows the variation of plunger pull for constant magnetomotive force in the floating coil, according to the variations of the plunger position when the solenoid is "air clad," that is, when the magnetic circuit is closed on one side by an air path. The plunger positions are shown on the horizontal axis, and the amount of pull on the vertical axis. From this curve it will be seen that during a short range of movement the plunger pull will remain practically constant when the magnetomotive force being exerted is maintained constant. Curve 30 shows a relationship similar to that of curve 29 except that the solenoid is "iron clad," that is, its magnetic circuit is completed by an iron path. It will be noted that when the solenoid is iron clad the range of movement during which the pull is practically constant is very much larger than is the case when the solenoid is not iron clad. It will be seen, however, that in each case the curve is slightly bent even in its flattest portion.

The coils 25 and 26 may be so connected into the circuit that the magnetomotive force developed by the operating coil 26 acts in opposition to that developed by the floating coil 25. It therefore follows that as the load comes on the total or net magnetomotive force falls. The parts may be so proportioned and arranged, that when the system is operating under the no load condition the plunger will be raised to its maximum limit. Thereafter as the load comes on the net magnetomotive force acting on the plunger will decrease, thus allowing the plunger to fall a certain distance thus effecting the desired regulation.

Under the foregoing conditions the operation of the governor may be shown diagrammatically by the curves in Fig. 3. In this figure the curve 30 is reproduced illustrating the relationship between the pull exerted by the floating coil and the position of the plunger when the current through the floating coil is constant to give a constant magnetomotive force from this coil. The curve 31 represents the reduction in pull exerted on the plunger owing to reduction of net magnetomotive force by reason of the increase of power current as the load comes on. This curve lies below the zero line for the reason that it is due to counter or negative magnetomotive force.

The net pull on the plunger is shown by the curve 32. This curve commences at the point 33 on the curve 30 and thereafter lies below the curve 30. It will be noted that at the no load point 33 the curve 30 is somewhat bent, and is rising very slightly. By properly proportioning the number of turns on the floating and operating coils the negative magnetomotive force caused by the load current may be made to pull the resultant curve 30 down to a substantially horizontal line throughout a distance corresponding to regulation from no load to full load. When the parts are thus proportioned it follows that the necessary plunger movements for regulation and equilibrium from no load to full load will be effected without any change in the magnetomotive force exerted by the floating coil. Therefore, assuming the resistance of the floating coil to remain unchanged, the regulation of the fuel valve will be accomplished throughout the entire range with a constant voltage across the terminals of the floating coil. Of course, as previously stated, the parts may be so proportioned that the increasing load will result in a rise or fall of voltage across the terminals of the floating coil, should that be desired.

I will now explain the mechanical construction of the governor which is illustrated in Fig. 1, and will point out wherein I have provided means for compensating for the changes in temperature so as to eliminate error or change due to change of resistance. The coils 25, 26, and 27 are shown as wound concentrically upon a single tube or spindle 34 of nonmagnetic material. For example this may be a tube of brass. Insulating heads 35 close in the ends of the coils and serve to thoroughly protect them. Surrounding the coils is a shield or inclosure 36 of iron or the like which establishes a magnetic path between the iron heads 37 and 38 so as to provide an "iron clad" construction. If desired, perforations 39 may be provided in the shield 36 so as to more effectively ventilate the structure.

The plunger 19 is shown as made up of the two sections 40 and 41. The upper section is attached to the bell crank 24 which in turn is connected by a suitable system of linkage to the throttle. The plunger sections 40 and 41 are separated a desired distance to provide an air gap 42, the length of which affects the reluctance of the magnetic circuit.

I have provided means for regulating or controlling the size of this air gap according to the changes in resistance of the floating coil, so that the characteristics of the curve 30 will not change as the temperature of the floating coil changes, with the result that the governor will regulate with the same characteristics when hot as when cold. In the particular arrangement illustrated the means for controlling the reluctance of the magnetic circuit takes the form of means for lengthening or shortening the air gap 42 as desired. For this purpose a receptacle 43 communicates with a tube or the like 44, both receptacle and tube comprising an inclosed space for the accommodation of a suitable expansible liquid 45. The receptacle 43 has its lower end supported at the point 46, so that as the liquid expands or contracts with changes of temperature the upper face or side 47 of the receptacle will be bulged out or allowed to move back, according to the changes of temperature. The portion 41 of the plunger rests upon or may be attached to the upper side 47 of the receptacle so that it will rise and fall with the same and thereby shorten or lengthen the air gap 42.

The plunger is preferably hollow to receive the tube 44 so that a portion of the liquid will extend up into the body of the solenoid where it will be most quickly and accurately acted upon by changes of temperature, so as to give a very nice and quick regulation. As a simple means of supporting the receptacle 43 and for guiding the lower portion 41 of the plunger in its movements, I have provided the nonmagnetic rod or bar 48 which has its upper ends attached to the upper portion 40 of the plunger, and which rod or bar extends down beneath and supports the receptacle. The portion 41 of the plunger has its sides slotted at 49 to accommodate the rod 48 and thereby be guided in its movements.

It will be seen from the foregoing that the size of the air gap 42 is made dependent upon the expansion and contraction of the liquid body, which in turn is subjected to variations of temperature according to the heat or cooling of the floating coil. In this way the change of resistance of the floating coil is compensated for by the change of magnetic reluctance so that the characteristics of the regulator remain constant. Of course in the particular arrangement illustrated the relationship is such that an increase of resistance with increase of temperature results in decrease of magnetic reluctance, so that the particular arrangement illustrated is peculiarly adapted for use in connection with a floating coil having a positive temperature coefficient. However, I do not limit myself to such a relationship, inasmuch as it is manifest that an arrangement could be adopted in which the reluctance would vary in the proper manner to compensate for change of resistance of a coil having a negative temperature coefficient.

It was previously mentioned that the coil 27 serves in a sense as a safety device for preventing an excessive rise of voltage. As set forth in a co-pending application for Letters Patent of the United States, filed by me October 29, 1913, Serial No. 798,134, this coil may be so connected into the system that if the voltage exceeds a desired value a circuit including the coil 27 will be closed, thereby energizing said coil and thus creating an additional lifting force on the plunger of the regulator to thereby cut down the gas supply.

While I have herein disclosed a governor making use of two coils, the floating coil and the operating coil, still it will be evident that the operating coil might be dispensed with in which case the floating coil would also serve the function of operating the plunger, but in such case the regulation for absolutely constant voltage could not be obtained because of the slight bending of the curve 30. In such case, however, the governor would regulate by change of engine speed.

I do not limit myself to the arrangement illustrated in the drawings, except as may be called for in the claims, but I include within the scope of my invention any equivalent mechanisms operating in equivalent manners to produce equivalent results.

I claim:

1. In an electromagnetic regulator the combination of a coil, a two-section hollow plunger armature, a body of expansible material operatively joining said sections together, and a portion of said body projecting upward into the hollow armature to be there subjected immediately to changes of temperature.

2. In an electromagnetic regulator the combination of a coil, a two-section plunger armature working within said coil, an expansible member connecting said sections together, and a portion of said expansible member projecting upward into the body of the armature to be there subjected immediately to changes of temperature.

3. In an electromagnetic regulator the combination of a coil, a two-section plunger armature working within said coil, and an expansible member connecting the sections of the armature together and under the influence of changes of temperature of the coil.

4. In an electromagnetic regulator the combination of a coil, a two-section armature, an expansible member, a connection from the expansible member to the armature to control the distance between the two sections of the armature, and means for causing the expansible member to expand and contract according to changes of temperature of the coil.

5. In an electromagnetic regulator the combination with a coil, of a two part plunger armature working within the same, an abutment connected to one part of said armature, a closed receptacle supported by said abutment, said receptacle having a movable face, an operative connection between said movable face and the other section of the armature, and an expansible fluid contained within the receptacle.

6. In an electromagnetic regulator the combination with a coil, of a two part plunger armature working within the same, an abutment on one portion of said armature, a closed receptacle mounted on said abutment and supported by the same, a portion of said receptacle projecting into the helix of the coil, a movable face on said receptacle, an operative connection from said face to the other part of the armature, and an expansible fluid in the receptacle.

7. In an electromagnetic regulator the combination with a coil, of a two part plunger armature working within the coil, an abutment connected to one part of said armature, a closed receptacle mounted on said abutment, said receptacle having one of its faces flat and movable with respect to the abutment, an operative connection between said face and the other part of the armature, and an expansible fluid within the receptacle and under the influence of the temperature existing within the coil.

8. In an electromagnetic regulator the combination with a coil of a two part armature under the magnetic influence of the same, an abutment connected to one part of the armature, a closed receptacle having one portion in engagement with the abutment, another portion of said receptacle being movable with respect to the abutment under variations of pressure within the receptacle, an operative connection from said portion of the receptacle to the other portion of the armature, and an expansible fluid within the receptacle and under the influence of temperature existing within the coil.

9. In an electromagnetic regulator the combination with a coil of a two part armature under the magnetic influence of the same, a closed receptacle, a connection from one portion of said receptacle to one portion of the armature, another portion of the receptacle being movable with respect to the first mentioned portion under variation of pressure existing within the receptacle, an operative connection from said last mentioned portion of the receptacle to the other portion of the armature, and an expansible fluid within the receptacle and under the influence of temperature existing within the coil.

LEE B. JONES.

Witnesses:
GEO. DEINES,
M. V. GUNSOLLEY.

Copies of this patent may be obtained for five cents each, by addressing the "Commissioner of Patents, Washington, D. C."